US009934017B2

(12) United States Patent
Yehuda et al.

(10) Patent No.: US 9,934,017 B2
(45) Date of Patent: Apr. 3, 2018

(54) METHOD AND A SYSTEM FOR MERGING SEVERAL BINARY EXECUTABLES

(71) Applicant: APPDOME LTD., Tel Aviv (IL)

(72) Inventors: Avner Yehuda, Ramat Gan (IL); Lior Halfon, Or Yehuda (IL); Meir Tsvi, Tel Aviv (IL)

(73) Assignee: APPDOME LTD., Tel Aviv (IL)

( * ) Notice: Subject to any disclaimer, the term of this patent is extended or adjusted under 35 U.S.C. 154(b) by 52 days.

(21) Appl. No.: 14/941,620

(22) Filed: Nov. 15, 2015

(65) Prior Publication Data

US 2017/0139696 A1    May 18, 2017

(51) Int. Cl.
*G06F 9/445*    (2006.01)
(52) U.S. Cl.
CPC .......................... *G06F 8/61* (2013.01)
(58) Field of Classification Search
None
See application file for complete search history.

(56) References Cited

U.S. PATENT DOCUMENTS

| 2014/0366015 A1* | 12/2014 | Dobson | G06F 8/60 717/177 |
| 2015/0339137 A1* | 11/2015 | Andrus | G06F 9/45516 717/148 |
| 2016/0092675 A1* | 3/2016 | Vidrine | G06F 21/52 726/22 |

* cited by examiner

*Primary Examiner* — Lewis A Bullock, Jr.
*Assistant Examiner* — Melissa Headly
(74) *Attorney, Agent, or Firm* — Fish & Richardson P.C.

(57) ABSTRACT

The huge market of smartphones demands a vast number of applications with varying capabilities. For this, it is desirable that capabilities of two or more pieces of executables will be delivered together. However, several operation systems, such as Apple iOS, do not allow downloading an application with more than one binary executable file. The purpose of this invention is to allow merging of several, two or more, pieces of binary executables, without an access to any of which source code. The merging process will handle the addressing environment required for correct code operation—creating a single virtual memory space and adapting the binding addresses, offset addresses and base addresses. This will enable executing all desired functionality from a single piece of a binary executable which can be downloaded as a single application from the app store. Problems of existing mobile OSes for application downloading will be resolved.

20 Claims, 3 Drawing Sheets

METHOD AND A SYSTEM FOR MERGING SEVERAL BINARY EXECUTABLES

BACKGROUND

The traditional way for adding functionality to existing executable is for the source code to dynamically import subroutines from a library (e.g. DLL), or to use a static library and link to it through the linking process. These methods require an access to the source code.

Other methods allow the user to call for new functionality during run time—not preparing a new downloadable code.

Other method are about automatically analyzing the source code and adapting it—again, a knowledge and access to the source code are required.

SUMMARY

The merging process is about merging several binary executable files, hereby an executable to a single binary executable. The major merging problem stems from the fact that addresses of the original executables may overlap.

Moreover, certain elements of the code are position dependent and will not operate correctly in a simple merge. The invention process will handle the addressing attributes required for correct executable operation—creating a single virtual memory and adapting the binding addresses, offset addresses and rebase addresses. This will enable executing all desired functions from a single executable which can be downloaded as a single application from the app store.

The process will be done in several steps as described below.

The process described is for 2 executables but it can be repeated to add more executables. Optionally the first executables an existing application with certain privileges but this is not a must, specifically the first executable is allowed to be position dependent.

DETAILED DESCRIPTION

Terminology

Executable—A binary file composed of one or more segments (described below) and additional data that describes properties of the executable and the relationship between the segments. An executable file is usually meant for execution by the host.

Mach-O: Apple's executable/library format

LINKEDIT: A Section inside Mach-O file that contains linking information such as imported and exported symbols, relocation information and more.

PIE—Position Independent Executable

Lazy Bind—A symbol that is 'binded' only after first use.

TheBaseExecutable—the first Mach-O being merged. It may be an executable or a dynamic library. It may or may not be position independent.

The Library—for simplicity, the term TheLibrary will refer to the one library being merged into the first executable. TheLibrary must be a dynamic library, and therefore must be a position independent binary.

Segment—every executable is composed of one or more segments. For example code segment, data segment etc. Each segment has its own data and virtual loading address.

More than one library may be merged into an executable by performing the merging process twice or more. For simplicity, it will be assumed only one library is merged.

DETAILED DESCRIPTION

Figure 1:
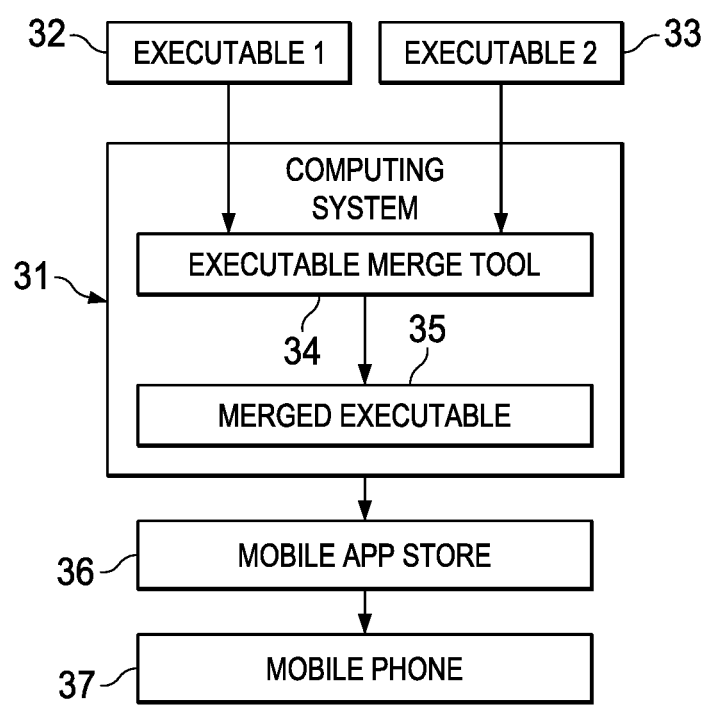
FIG. 1 is a potential system description for a mobile phone system.

FIG. 1 is showing a potential system for a mobile phone app store deployment system.

Executable 1 32 and Executable 2 33 are being fetched to a computing system 31. This can be from two separate servers/computing systems over the internet or in any other way an executable can be brought in. More than two executables can be fetched. The computing system will have in it an executable merging tool as further described and will merge all executables into a single executable. This will create a new application which can be loaded to a mobile system app store where it will be downloaded by mobile phones to a mobile phone and executed over there.

The invention is valid for any type of a computing environment, not necessarily to the system described above.

Figure 2:
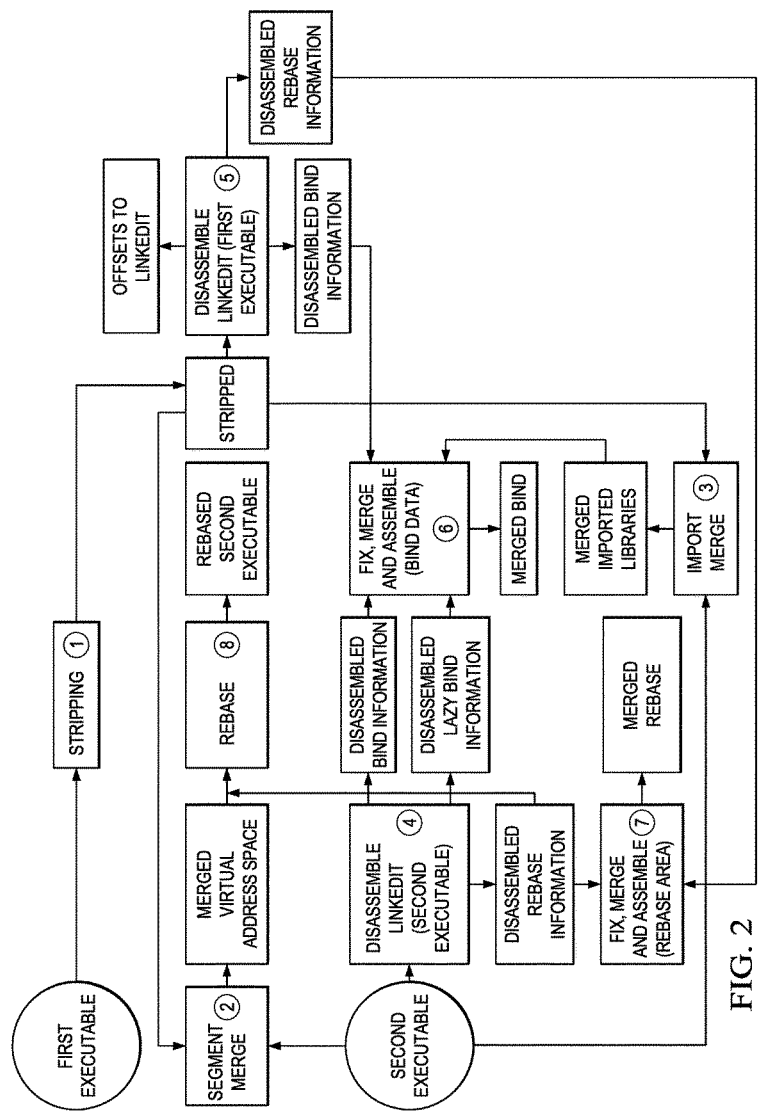
FIG. 2 is a process flow chart description.
Figure 3:
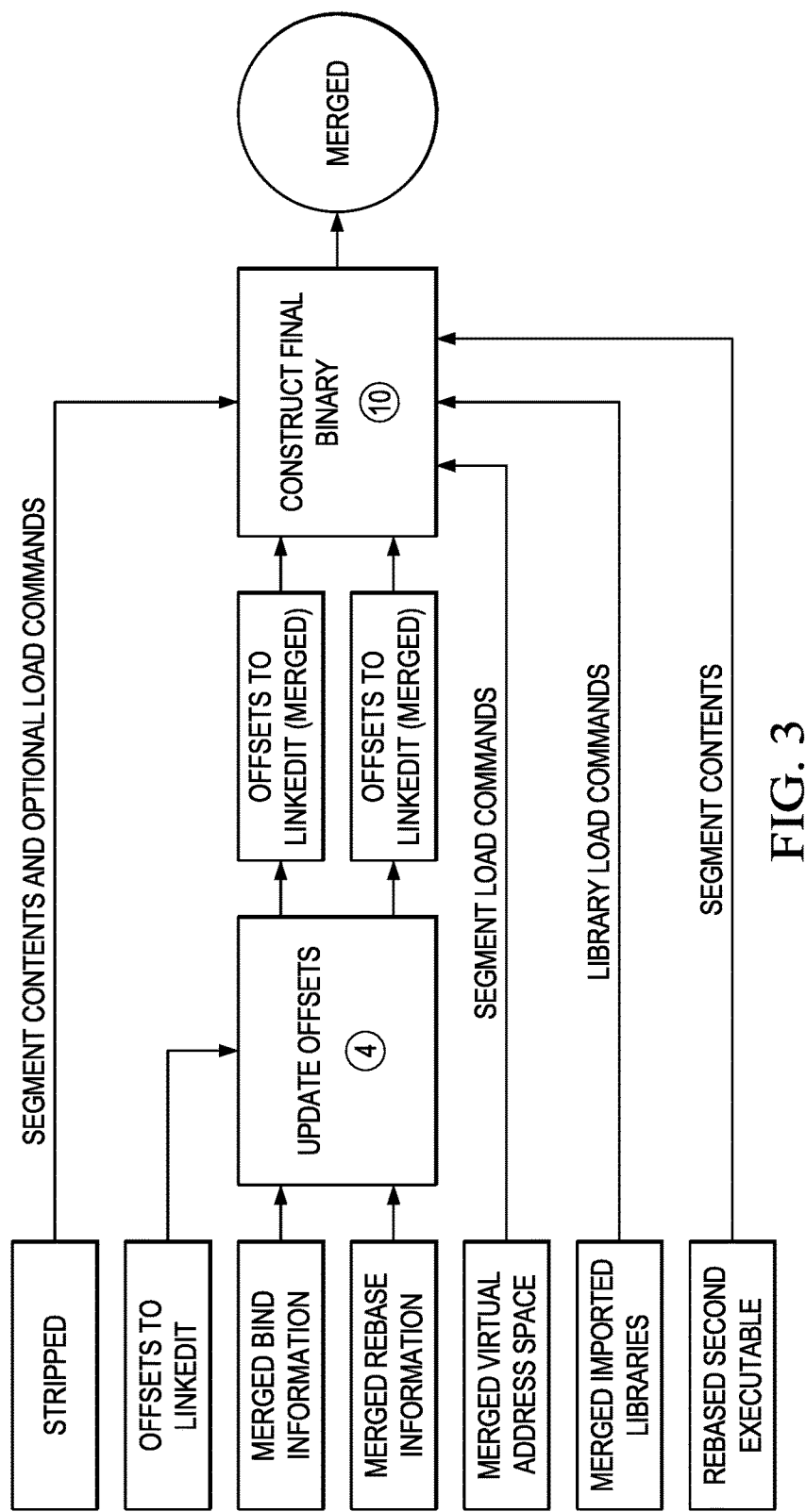
FIG. 3 is a continuation of this flow chart.

The merge process consists of several steps. An example is shown in FIG. 2 and FIG. 3.

The merge process described is for 2 executables but it can be repeated for more.

The merge process can be executed in any type of a computing system, operating system or CPU.

However, the described process is specific for an Apple iOS Mach-O:

1. Strip optional meta-data from header: in order to save header space for new additional data.
2. Merge the segments, and reconstruct the virtual address space: creating a new address space layout for the merged executable, and placing the sections' data in the file.
3. Merge imported libraries: the merged executable should link against both libraries referred by the first executable, and the libraries used by the second executable.
4. Disassemble 2nd executable LINKEDIT segment.
5. Disassemble First Executable LINKEDIT segment.
6. Merge binding information: binding information inserts pointers to external symbols in data or text executable(s). Modify the binding information per executable to match the new address space layout and imported libraries list, and merge the two sources of information to one chunk.
7. Merge rebasing information: the rebase information adds the library load address to pointers so dynamic libraries (and PIE) can load at any address. Modify the rebase information to match the new address space layout, and merge the two sources of information to one chunk.
8. Rebase the 2nd executable for its addresses: Internal absolute pointers inside the added library no longer point to the correct location after relocating it. They must be corrected.
9. Update offsets to modified linking information: the segment containing the linking information was modified and moved. It is required to modify all offsets to this segment.
10. Construct a final executable: combining all information created in the previous steps, together with untouched "inherited" information from the first executable to form a final executable.

Several steps described above will be described below in further details

Meta Data stripping

Usually, binaries have enough free space between their header and their first segment. However, this is not always true, so some metadata must be deleted (for example, in Mach-O, in the form of load commands) that are not required by the OS for new load commands to fit.

Some of the load commands to be deleted for iOS are: LC_UUID, LC_SOURCE_VERSION, LC_FUNCTION_STARTS . . .

Every aspect related to code signature should be removed, since the file must be resigned after completion.

Segment Merging in the following manner:

Append all segments from the first executable in their original virtual address, except for the segment containing the linking information (for example, LINKEDIT in Mach-O). By keeping the segments in their original virtual addresses, it allows the first executable to be a position dependent executable.

Copy the on-file memory of each segment to the merged binary, and make sure file offset for each segment is correct.

Find the last used virtual address, and save it for later. From now on, this will be called Library Base. Optionally, a value may be added to this base, perhaps for specific alignment requirements.

Append all segments from the 2nd executable, with Library Base added to their original virtual address. Again, skip the segment containing the linking information. Add "2" (or 3, 4, etc. if this is not the first merge) to the name of each Segment. Apply the same change for the segment name attribute of each section in the segment for formats requiring this change.

Copy the on-file memory of each segment to the merged binary, and correct the file offset for each segment.

Imported libraries merge:

Create a list of the libraries imported by the base executable. From now on, this list will be called Base Imports.

Create a list of the libraries imported by 2nd executable. From now on, this list will be called Library Imports.

Create a third list, containing all libraries appearing in the two or more previous lists, without duplicates. Preferably, this list will be ordered in a way so Base Imports is a prefix of this list. This attribute will become handy when merging the bind codes. From now on, this list will be called Merged Imports.

For each library in the Merged Imports, create an appropriate load command in the merged executable.

Binding information merge

An executable has binding information, which "links" between symbol name and an offset to a pointer that should point to that name. For the created new executable to function correctly inside the first executable's address space, the linker must bind its symbols in addition to the first executable's symbols. Therefore, the two binding data information from both files must be parsed, and be merged into to one chunk of data information.

In formats that have a bytecode-like representation of binding information, like Mach-O, this method will be used:

Disassemble the first executable bind data, and $2^{nd}$ executable bind and lazy bind data into intermediate format.

When disassembling commands that refer to a library by its index, replace the index with a string representing the library name, using the Base Import and Library Imports lists.

When disassembling commands that refer to a segment by its index in the end executable bind/lazy bind code, remember to add the index of the first segment of The Library in the merged executable.

When disassembling commands that refer to an offset from the library base address (for example, Mach-O does not contain such commands), add Library Base to that offset.

Strip "done" (i.e. any command that stops bytecode parsing) commands from all disassemblies.

Append the 3 disassemblies together (The order is not relevant), and append a final "done" command.

Assemble the output. Use Merged Imports when converting commands referring to a library by its name to an index.

Note that lazy imports are now being processed as normal ones at the cost of minor startup time overhead. This allow us to keep the stub code unmodified, and keep the merging process processor agnostic, since lazy symbol stubs might contain instructions that identify the symbol within the executable, and that identification might no longer be valid in the merged executable.

Merging rebasing information

Rebase code is merged in the same manner, except no special attention for imported libraries is required, since they are not referred.

Update offsets to a modified linking information

Since the segment containing the linking information (bind and rebase, for example) was modified and removed, any offset referring to it must be updated.

For example, in Mach-O:

Find the LC_DYLD_INFO_ONLY command of the base executable.

Extract all data referred by the load command.

Replace bind and rebase the one merged code created in the previous steps.

Create a new LINKEDIT segment with the data, and fix LC_DYLD_INFO_ONLY's offsets and sizes.

Rebase 2nd executable

Parse the 2nd executables rebase information, parse it in the same manner the dynamic loader would.

For example, In Mach-O context, that would mean executing the rebase bytecode during the merge process.

When rebasing an address, instead of adding the slide, Library Base will be added.

Reconstruct the executable

First, append all data referred by the new segments. This also includes the first executable's header at the beginning of the file.

Then, overwrite the original header with a new one, based on the original header but after applying required new changes.

For example, In a Mach-O executable:
  Overwrite the original header's load commands with new load commands, which include new segment commands, library load commands, DYLD info commands, and any unstripped commands from the first executable.
  Correct the number of commands and commands sizes field.

What is claimed is:

1. A method comprising:
obtaining, by one or more computer processors, first and second binary executable files;
merging, by the one or more computer processors, segments of the first and second binary executable files;
reconstructing, by the one or more computer processors, a virtual address space in memory for the merged first and second binary executable files;
rebasing, by the one or more computer processors, the second binary executable file according to the reconstructed virtual address space;
disassembling, by the one or more computer processors, first linking information of the first binary executable file into first binding information, first rebase information and offsets of the first binding information and the first rebase information to the first linking information;
disassembling, by the one or more computer processors, second linking information of the second binary executable file into second binding information and second rebase information;
fixing, merging and reassembling, by the one or more computer processors, the first and second binding information;
fixing, merging and reassembling, by the one or more computer processors, the first and second rebase information;
updating, by the one or more computer processors, the offsets to the first linking information for the merged binding information and the merged rebasing information; and
constructing, by the one or more computer processors, a third binary file using the updated offsets, the reconstructed virtual address space, the rebased second binary executable file and one or more segments from the first binary executable file.

2. The method of claim 1, further comprising:
merging, by the one or more computer processors, imported libraries for the first and second binary executable files;
fixing, merging and reassembling, by the one or more computer processors, the first and second binding information and the merged imported libraries; and
constructing, by the one or more computer processors, a third binary file using the updated offsets, the reconstructed virtual address space, the merged imported libraries, the rebased second binary executable file and one or more segments from the first binary executable file.

3. The method of claim 1, wherein metadata in a header of at least one of the first and second binary executables is deleted to save space for new data in the header.

4. The method of claim 1, wherein fixing, merging and reassembling the first and second binding information includes modifying the first and second binding information to match an address space layout of the reconstructed virtual memory.

5. The method of claim 1, wherein fixing, merging and reassembling the first and second rebase information includes modifying the first and second rebase information to match an address space layout of the reconstructed virtual memory.

6. The method of claim 1, wherein merging segments of the first and second binary executable files further comprises:
appending first segments of the first binary executable, except the first linking information segment, to original virtual addresses of the first segments;
copying each first segment to a merged binary file and correct file offsets for the first segments;
finding and storing a last used virtual address of the first segments as a library base;
appending second segments of the second binary executable, except the second linking information segment, with the library base added to original virtual addresses of the second segments;
adding a numerical value indicating to each segment's name, the numerical value identifying the merge; and
copying each second segment to the merged binary file and correct file offsets for the second segments.

7. The method of claim 1, wherein absolute addresses inside one or more of the binary executables are modified to match to the reconstructed virtual address space.

8. The method of claim 1, wherein the first and second binary executables have a Mach-O format.

9. The method of claim 1, where the first binary executable is position dependent.

10. A system comprising:
one or more server computers;
memory coupled to the one or more server computers and storing instructions that when executed by the one or more server computers cause the one or more server computers to perform operations comprising:
  obtaining first and second binary executable files;
  merging segments of the first and second binary executable files;
  reconstructing a virtual address space in the memory for the merged first and second binary executable files;
  rebasing the second binary executable file according to the reconstructed virtual address space;
  disassembling first linking information of the first binary executable file into first binding information, first rebase information and offsets of the first binding information and the first rebase information to the first linking information;
  disassembling second linking information of the second binary executable file into second binding information and second rebase information;
  fixing, merging and reassembling the first and second binding information;
  fixing, merging and reassembling the first and second rebase information;
  updating the offsets to the first linking information for the merged binding information and the merged rebasing information; and
  constructing a third binary file using the updated offsets, the reconstructed virtual address space, the rebased second binary executable file and one or more segments from the first binary executable file.

11. The system of claim 10, the operations further comprising:
merging imported libraries for the first and second binary executable files;

fixing, merging and reassembling the first and second binding information and the merged imported libraries; and constructing a third binary file using the updated offsets, the reconstructed virtual address space, the merged imported libraries, the rebased second binary executable file and one or more segments from the first binary executable file.

12. The system of claim 10, wherein metadata in a header of at least one of the first and second binary executables is deleted to save space for new data in the header.

13. The system of claim 10, wherein fixing, merging and reassembling the first and second binding information includes modifying the first and second binding information to match an address space layout of the reconstructed virtual memory.

14. The system of claim 10, wherein fixing, merging and reassembling the first and second rebase information includes modifying the first and second rebase information to match an address space layout of the reconstructed virtual memory.

15. The system of claim 10, wherein merging segments of the first and second binary executable files further comprises:

appending first segments of the first binary executable, except the first linking information segment, to original virtual addresses of the first segments;

copying each first segment to a merged binary file and correct file offsets for the first segments;

finding and storing a last used virtual address of the first segments as a library base;

appending second segments of the second binary executable, except the second linking information segment, with the library base added to original virtual addresses of the second segments;

adding a numerical value indicating to each segment's name, the numerical value identifying the merge; and copying each second segment to the merged binary file and correct file offsets for the second segments.

16. The system of claim 10, wherein absolute addresses inside one or more of the binary executables are modified to match to the reconstructed virtual address space.

17. The system of claim 10, wherein the first and second binary executables have a Mach-O format.

18. The system of claim 10, wherein the first binary executable is position dependent.

19. The system of claim 10, further comprising:

sending the third binary file to one or more computing devices.

20. The system of claim 10, wherein the first and second binary executables are received from one or more computing systems over the Internet.

* * * * *